United States Patent
Patel et al.

(10) Patent No.: US 12,447,946 B1
(45) Date of Patent: Oct. 21, 2025

(54) TORQUE CONTROL MODELING FOR TORQUE CONTROL OF HYBRID ELECTRIC POWERTRAINS

(71) Applicant: FCA US LLC, Auburn Hills, MI (US)

(72) Inventors: Nadirsh Patel, Auburn Hills, MI (US); Hangxing Sha, Auburn Hills, MI (US); Abdulquadri Banuso, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/782,571

(22) Filed: Jul. 24, 2024

(51) Int. Cl.
  *B60W 20/40* (2016.01)
  *B60W 10/02* (2006.01)
  *B60W 10/06* (2006.01)
  *B60W 10/08* (2006.01)

(52) U.S. Cl.
  CPC ......... *B60W 20/40* (2013.01); *B60W 10/026* (2013.01); *B60W 10/06* (2013.01); *B60W 10/08* (2013.01); *B60W 2510/1015* (2013.01); *B60W 2710/024* (2013.01); *B60W 2710/1022* (2013.01)

(58) Field of Classification Search
  CPC .... B60W 20/40; B60W 10/026; B60W 10/06; B60W 10/08; B60W 2510/1015; B60W 2710/024; B60W 2710/1022
  See application file for complete search history.

(56) References Cited

U.S. PATENT DOCUMENTS

| | | | |
|---|---|---|---|
| 9,150,219 B2* | 10/2015 | Wang | B60W 10/06 |
| 9,656,657 B2* | 5/2017 | Gibson | F16D 48/06 |
| 10,640,106 B2* | 5/2020 | Meyer | B60W 10/06 |
| 11,225,242 B1* | 1/2022 | Bolthouse | F02D 41/0002 |
| 2009/0227422 A1* | 9/2009 | Fayyad | F16H 61/143 |
| | | | 477/176 |
| 2018/0009433 A1* | 1/2018 | Johri | F02D 41/065 |
| 2018/0244260 A1* | 8/2018 | Ruybal | B60W 10/02 |
| 2018/0281778 A1* | 10/2018 | Zhang | B60W 20/40 |
| 2019/0047549 A1* | 2/2019 | Johri | B60K 6/387 |
| 2020/0079350 A1* | 3/2020 | Morrison | B60W 20/40 |
| 2021/0171006 A1* | 6/2021 | Syed | B60W 10/026 |
| 2024/0067156 A1* | 2/2024 | Baxendale | B60W 20/10 |

* cited by examiner

*Primary Examiner* — Jacob S. Scott
*Assistant Examiner* — Farhana Pervin
(74) *Attorney, Agent, or Firm* — Jeremy J. Klobucar

(57) ABSTRACT

An electrified powertrain that generates and transfers drive torque to a driveline of a hybrid electric vehicle is provided. The powertrain includes an engine, an electric motor, a clutch, a torque converter and a controller. The clutch selectively disengages an engine output from a remainder of the electrified powertrain. The torque converter transfers rotating power from at least one of the engine and the electric motor to a transmission. The controller is configured to: receive an impeller speed and a turbine speed of the torque converter; determine a target turbine torque; determine coefficients as a function of the impeller speed, turbine speed and target turbine torque; update an adaptive lookup table based on the coefficients; and determine an adapted turbine torque based on the updated adaptive lookup table.

4 Claims, 7 Drawing Sheets

TORQUE CONTROL MODELING FOR TORQUE CONTROL OF HYBRID ELECTRIC POWERTRAINS

FIELD

The present application generally relates to hybrid electric vehicles and, more particularly, to a system and method for modeling a torque converter in hybrid vehicles to enhance torque delivery accuracy and efficiency.

BACKGROUND

A hybrid electric vehicle includes an internal combustion engine (ICE), at least one high-voltage battery system and at least one electrified drive module having an electric motor and associated electric drive gearbox assembly. The ICE and electric motor(s) can be generally referred to as prime movers. To effectively manage the efficiencies of these prime movers, they require to be connected and disconnected to the driveline. A torque convertor is provided in the driveline that transfers rotating power from a prime mover to a rotating driven load. In examples, the torque converter transfers rotating power from a prime mover to a transmission. The operation of the torque converter directly impacts torque delivery accuracy and efficiency of the driveline. Even though torque converters are widely used in conventional and hybrid vehicles, torque converter modeling strategies can be very calibration intensive to set up the torque ratio and impeller torque correctly. Accordingly, while such torque converter modeling strategies do work well for their intended purpose, there is a desire for improvement in the relevant art.

SUMMARY

According to one example aspect of the invention, an electrified powertrain that generates and transfers drive torque to a driveline of a hybrid electric vehicle is provided. The powertrain includes an engine, an electric motor, a clutch, a torque converter and a controller. The clutch selectively disengages an engine output from a remainder of the electrified powertrain. The torque converter transfers rotating power from at least one of the engine and the electric motor to a transmission. The controller is configured to: receive an impeller speed and a turbine speed of the torque converter; determine a target turbine torque; determine, coefficients as a function of the impeller speed, turbine speed and target turbine torque; update an adaptive lookup table based on the coefficients; and determine an adapted turbine torque based on the updated adaptive lookup table.

In some implementations, the controller is further configured to determine, the coefficients as a function of the impeller speed, turbine speed and target turbine torque based on implementation of a Kalman filter.

In some implementations, the controller is further configured to determine, at the Kalman filter, the coefficients as a function of a positive slip speed of the torque converter.

In some implementations, the controller is further configured to calculate impeller torque and lock-up clutch torque based on the positive slip speed of the torque converter.

In additional features, the controller is further configured to determine a status of the clutch based on the lock-up clutch torque.

In additional features, a method that generates and transfers drive torque to a driveline of a hybrid electric vehicle is provided. The driveline includes an engine having an engine output, an electric motor having a first electric motor output, a clutch that selectively disengages the engine output from a remainder of the electrified powertrain, a torque converter that transfers rotating power from at least one of the engine and the electric motor to a transmission, and a controller. The method includes receiving, at the controller, an impeller speed and a turbine speed of the torque converter; determining, at the controller, a target turbine torque; determining, at the controller, coefficients as a function of the impeller speed, turbine speed and target turbine torque; updating, at the controller, an adaptive lookup table based on the coefficients; and determining, at the controller, an adapted turbine torque based on the updated adaptive lookup table.

In additional features, the method includes determining, at the controller, the coefficients as a function of the impeller speed, turbine speed and target turbine torque based on implementation of a Kalman filter.

In additional features, the method includes determining, at a Kalman filter, the coefficients as a function of a positive slip speed of the torque converter.

In additional features, the method includes calculating an impeller torque and lock-up clutch torque based on the positive slip speed of the torque converter.

In additional features, the method includes determining a status of the clutch based on the lock-up clutch torque.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As mentioned above, a torque convertor is provided in a vehicle driveline that transfers rotating power from a prime mover to a rotating driven load. In examples, the torque converter transfers rotating power from a prime mover to a transmission. The operation of the torque converter directly impacts torque delivery accuracy and efficiency of the driveline. Even though torque converters are widely used in conventional and hybrid vehicles, torque converter modeling strategies can be very calibration intensive to set up the torque ratio and impeller torque correctly.

In previous methods, a torque converter is modelled by estimating impeller and turbine torque using the classical Kotwicki's set of equations for torque multiplication and coupling regions or a generic lookup table based on dynamometer (hereinafter "dyno") data in an electronic control unit. A lookup table can be used to map the impeller torque based on engine speed and speed ratio. However, the impeller torque calibration table can be calibration intensive, and is susceptible to inaccurate estimations of impeller and turbine torque due to parameters such as, but not limited to, engine torque accuracy, transmission oil temperature, hardware variation.

The present disclosure provides a system and method for modeling torque converter in conventional and hybrid vehicles to enhance torque delivery accuracy and efficiency. A mathematical model is established to represent the polynomial relationship between turbine torque and slip speed. The mathematical model is used in a forward torque converter model to calculate current impeller torque based on known input speed and turbine speed and a reverse torque converter model to calculate target input speed to deliver driver torque request. The parameters of the polynomial torque converter model are online identified with a Kalman Filter to adapt the model to the varying transient operating conditions of the powertrain.

Figure 1:
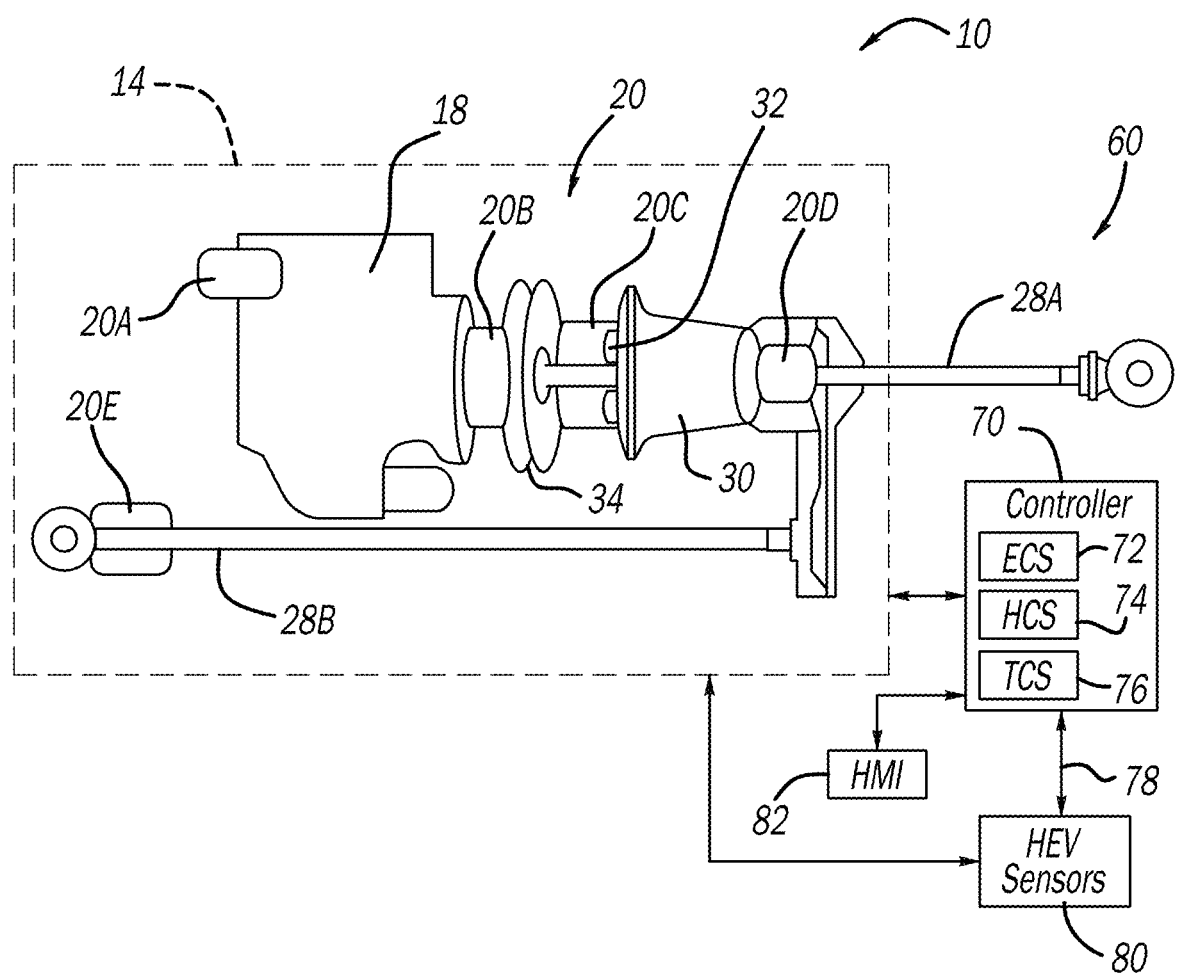
FIG. 1 is a functional block diagram of a hybrid electric vehicle that implements a system and method for torque convertor modeling for torque control of the hybrid electric vehicle according to various principles of the present disclosure.
Figure 2:
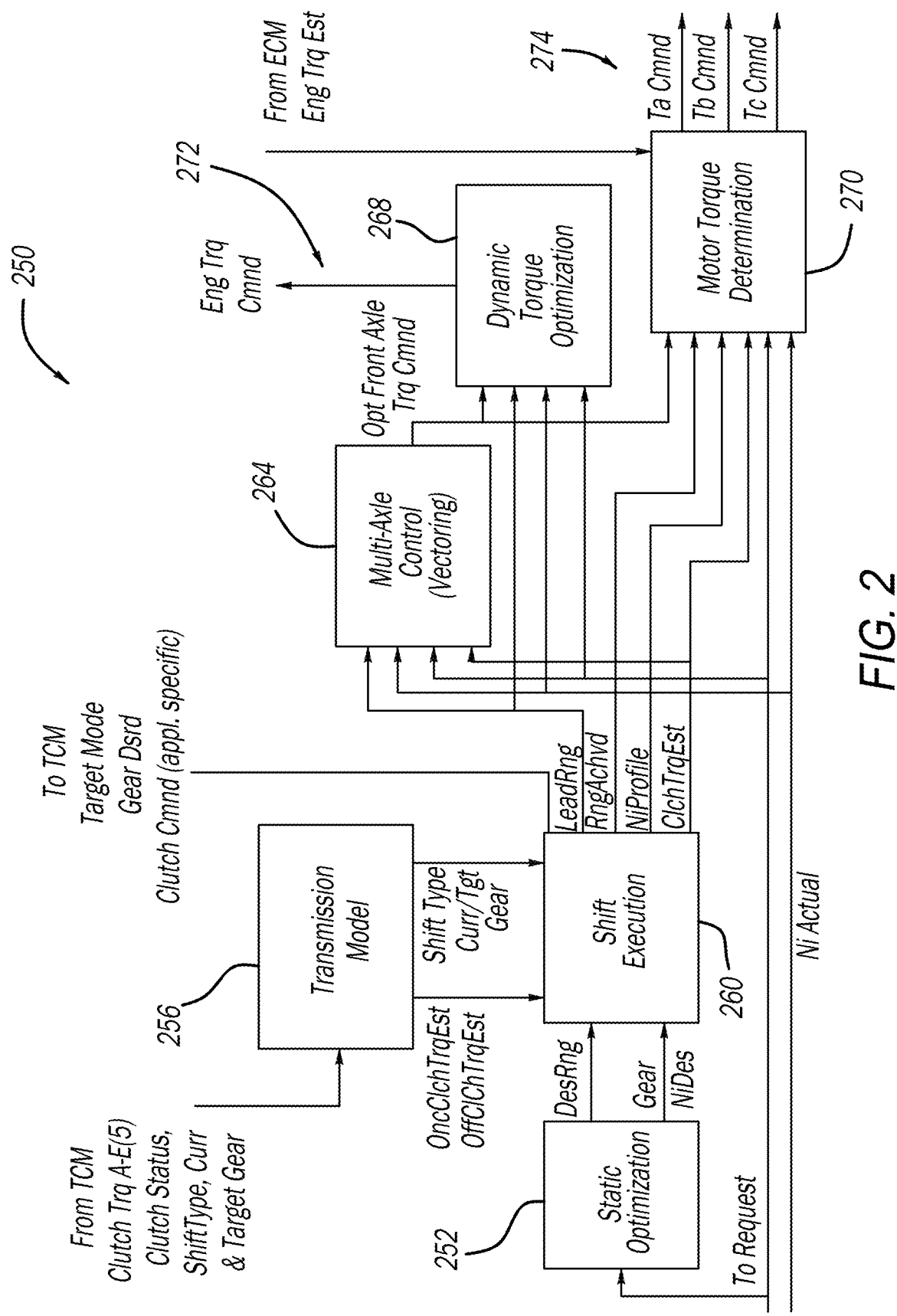
FIG. 2 is a functional block diagram of a hybrid supervisory control implemented by the controller of the hybrid electric vehicle of FIG. 1 according to one example of the present disclosure.

Referring now to FIGS. 1 and 2, a functional block diagram of an example hybrid electric vehicle 10 (also referred to herein as "vehicle 10") according to the principles of the present application is illustrated. While the following discussion is directed toward a hybrid vehicle, the principles of the present disclosure can be applied to a conventional ICE vehicle. The vehicle 10 includes an electrified powertrain 14 generally including an internal combustion engine 18 and an electric motor 20. The vehicle 10 illustrates various configurations having various electric motors 20A, 20B, 20C, 20D and 20E. The electrified powertrain 14 is configured to deliver drive torque from the engine 18, from the electric motor 20, or any combinations thereof, through a driveline 22 including gearbox 24 and to drive wheels 26. The electrified powertrain 14 is shown in FIG. 2 configured to drive rear drive wheels 26 through a first driven axle 28A however, the electrified powertrain 14 can be configured to alternatively or additionally drive front drive wheels (not shown) through a second driven axle 28B.

The electrified powertrain 14 includes a transmission 30, a torque converter 32, and a clutch 34 (also referred to herein as "lock-up clutch"). The clutch 34 selectively disengages an output of the engine 18 from a remainder of the electrified powertrain 14. In examples, the electric motor 20A and 20B represents the starting motor for the engine 18 or belt starter generator (BSG), connected to the engine via a belt system 38. The motors 20C, 20D and 20E represent traction motors that can be used to deliver drive torque to the drive wheels 40 (such as during electric mode). As shown, the motors 20C, 20D and 20E are disposed at different positions in the powertrain 14. In general, the position of the motors 20C, 20D and 20E represents the type of hybrid architecture. For example, using motor 20A and 20C represents using motor 20A before the engine 18 and the motor 20C after the engine 18 but before (or within) the transmission 30. The electric motors 20A and 20B are generally less powerful than traction motors 20C, 20D and 20E and can be operated by the 12 volt or 48 volt power system of the vehicle 10.

A control system 60 for controlling operation of the electrified powertrain 14 includes a controller 70 that provides various inputs to the electrified powertrain 14. The controller 70 is shown having an engine control system (ECS) 72, a hybrid control system, or hybrid supervisor (HCS) 74, and a transmission control system (TCS) 76. The controller 70 receives signals 78 from hybrid electric vehicle sensors 80 indicative of various operating conditions of the powertrain 14. It is appreciated that the controller 70 can have additional controllers and/or modules for communicating signals to the electrified powertrain 14 within the scope of the present disclosure. The controller 70 can send signals to a human machine interface (HMI) 82 to display messages, fault codes, etc., indicative of various drive conditions related to the powertrain 14 specifically and of the vehicle 10 as a whole. The HMI 82 can be an instrument cluster, an infotainment device, a heads-up display, a handheld device (e.g., cellular phone) or any other device capable of communicating a message to a driver indicative of a drive state or other condition of the vehicle 10.

The HCS 74 oversees the states of operation of the vehicle 10 and allocates drive torque and speeds for all torque actuators (e.g., the internal combustion engine 18 and the electric motors 20). The HCS 74 commands opening and closing of the clutch 34 and manages shift execution during engine start conditions. The controller 70 implements the control strategy described herein.

With additional reference now to FIG. 2, a functional block diagram of a hybrid supervisory control 250 implemented by the controller 70 of the hybrid electric vehicle 10 of FIG. 1 according to one example of the present disclosure will be described. The hybrid supervisory control 250 generally determines what torque is needed to deliver from a respective gear to the drive wheels. In examples, the hybrid supervisory control 250 can operate in open loop to provide a motor torque command.

The hybrid supervisory control 250 includes a static optimization module 252, a transmission model 256, a shift execution module 260, a multi-axle control vectoring module 264, a dynamic torque optimization module 268 and a motor torque determination module 270.

The static optimization module 252 employs iterative algorithms to systematically explores all possible powertrain state combinations, seeking the optimal configuration. The dynamic torque optimization module 268 iteratively adjusts torque commands to the ICE 18 and the electric motors 20 to identify the most suitable combination of powertrain actuators. The combination achieves the desired driver demand while concurrently governing various powertrain inertias to adhere to their prescribed speed trajectories. The dynamic torque module 268 outputs a torque command 272 to the ICE 18. The motor torque determination module 270 outputs torque commands 274 to the electric motors 20. In effect, the hybrid supervisory control 250 develops a driver demand reference trajectory 210 (drive torque requested 274 by the driver to the drive wheels).

Figure 3:
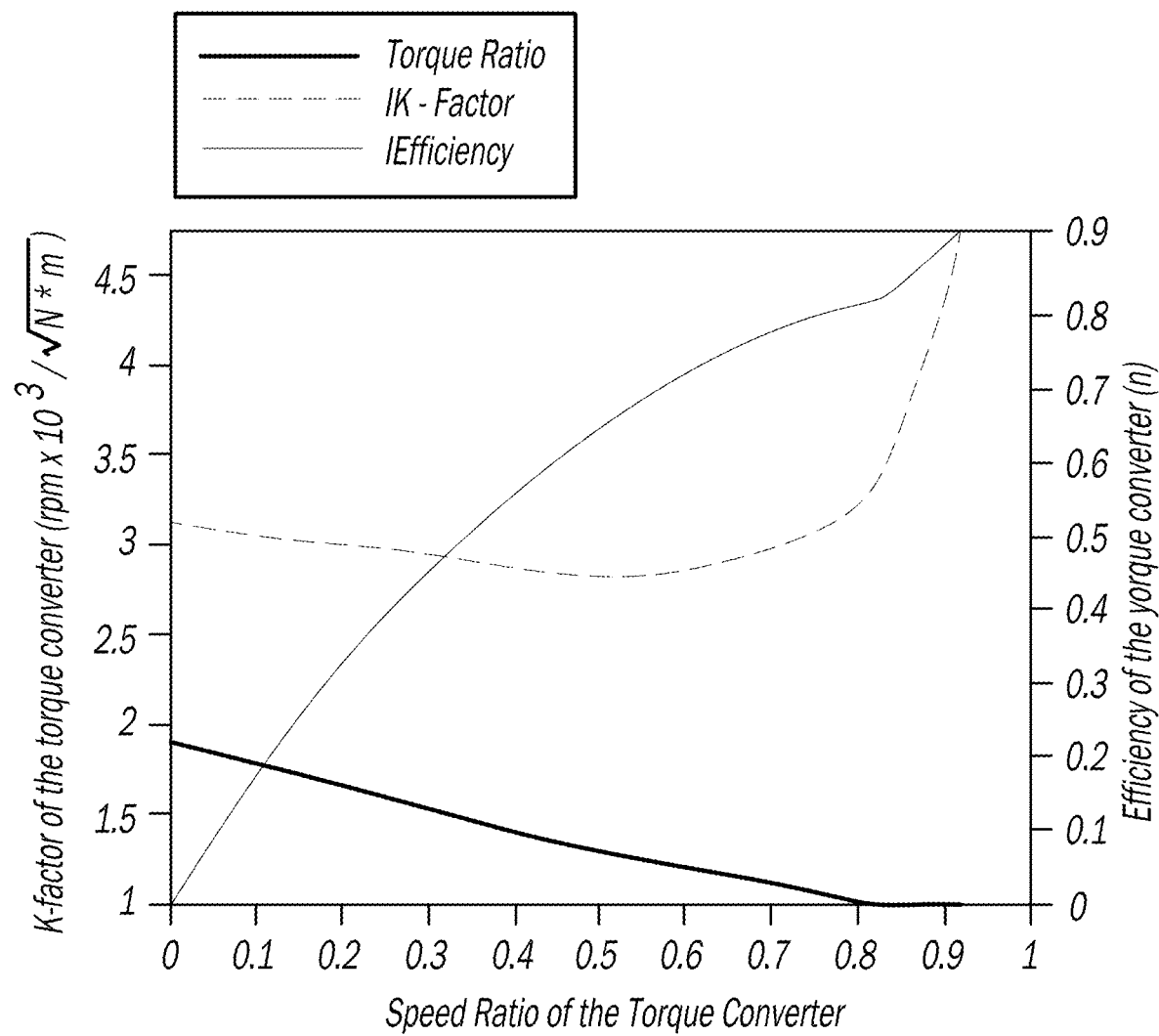
FIG. 3 is a plot of normalized torque converter characteristics showing an increasing of speed ratio, K-factor and efficiency while torque ratio is decreasing toward 1 according to examples of the present disclosure.

Turning now to FIG. 3, a plot is depicted of normalized torque converter characteristics showing an increasing of speed ratio, K-factor and efficiency while torque ratio is decreasing toward 1 according to examples of the present disclosure.

The techniques described herein model the torque converter 32 using polynomial equations that will relate its output torque or turbine torque to the slip of the torque converter 32 at a certain turbine speed. This approach is further enhanced with online parameter estimation to consider part variability, time changing effects such as temperature wear and tear of the components, transmission fluid viscosity etc. The unique aspect of the solution is the modeling approach using a polynomial fit, that can then be extended towards coefficient adaption to enable its use across a wide spectrum of vehicles.

The dyno data of a torque converter 32 is processed with a wide range of impeller-turbine speeds to reveal the polynomial relationship between the turbine torque and positive slip speed ($N_c$) at certain turbine speed ($N_{turbine}$) for the forward model. The polynomial fit accuracy is above 99.9%. The accuracy result indicates that it is reliable to use the equation:

$$T_{turbine} = A*N_c^2 + B*N_c \quad (1)$$

where $T_{turbine}$, A, B and $N_c$ represent turbine torque, the coefficients of the TC and they are function of turbine speed and slip speed, respectively.

To enhance the hybrid supervisor's 74 performance in static optimization, requires the most accurate and current torque converter model. This is crucial for determining the optimal input speed needed. In dynamic optimization, especially for creep control within a feedforward-feedback control system, it is essential to calculate the transmission input actuator torque based on wheel input, considering various hybrid configurations that include a torque converter. With the updated A, B coefficients and polynomial equations, the torque path torque converter ring is calculating impeller torque and lock-up clutch torque based on the slip speed. With the more accurate forward torque converter model, more accurate lock up clutch torque is calculated, and it is further used to determine the actual status of the lock up clutch. And the reverse torque converter model is derived as $$N_c = \left\{ \frac{-B}{2A} + \sqrt{\frac{T_{Turb} + \frac{B^2}{4A}}{A}} \text{ or } \frac{-B}{2A} - \sqrt{\frac{T_{Turb} + \frac{B^2}{4A}}{A}} \right\} \quad (2)$$

Figure 4:
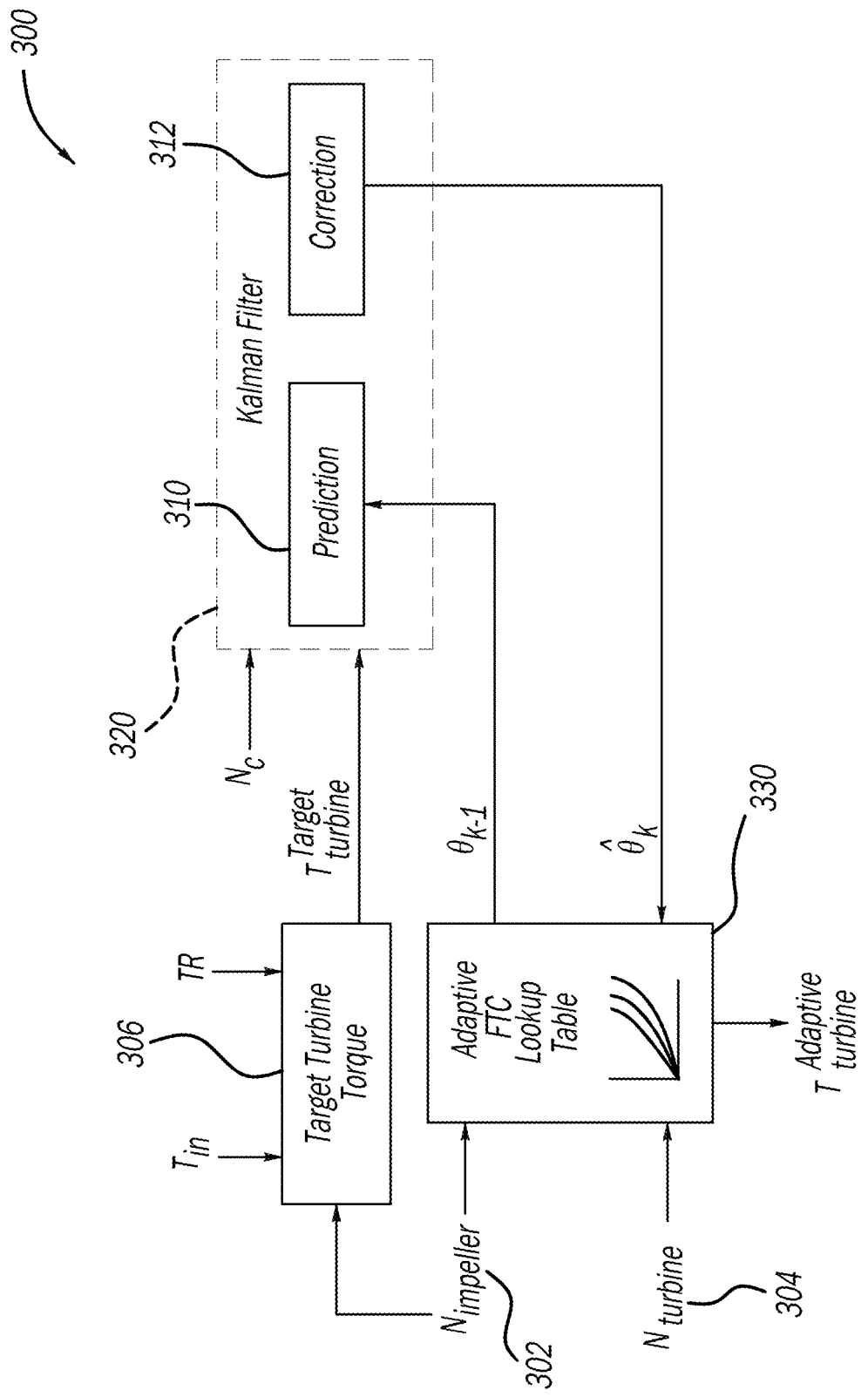
FIG. 4 illustrates an exemplary control flow diagram of steps carried out by the controller of FIG. 1 while implementing method for torque convertor modeling for torque control of the hybrid electric vehicle according to various examples of the present disclosure.

A Kalman Filter is chosen as the optimum filter due to its robustness to measurement variance. FIG. 4 highlights an exemplary control flow diagram 300 of steps carried out by the controller 70 of FIG. 1 while implementing a method for torque convertor modeling for torque control of the hybrid electric vehicle 10. Impeller speed 302 and turbine speed 304 are used as inputs. A target turbine torque module 306 outputs a target turbine torque. The adaptation strategy with a torque trajectory is generated for the FTC adaptation. Based on a prediction module 310 and a correction module 312 shown in the dashed Kalman Filter box 320, the coefficients are identified with a Kalman Filter. A and B coefficients are calculated at the current operating points and are used as inputs to directly update the FTC look up table 330.

With the standard parameter measurement output model defined as: $y = H\theta_k$ and the FTC model defined in equation (1), a mathematical relationship is expressed between the measurement output model and the FTC model as follows:

$$T_{turbine} = [N_c^2 \quad N_c] \begin{bmatrix} A \\ B \end{bmatrix}$$

$$y = H\theta_k$$

$$y = T_{turbine}$$

$$H = [N_c^2 N_c]$$

$$\theta = [AB]^T \quad (3)$$

Where, H represents the measurement function, and $\theta$ represents the parameters.

This adaptation strategy is setup to minimize the following objective problem:

$$J = \sum_{i=1}^{M}(y_k - \hat{y}_k)^2, \hat{y}_k = H\hat{\theta}_k \quad (4)$$

Where, J=cost function, $\hat{y}$=estimated output at the time step, k, and y=current output at the time step, k.

To implement a KF based parameter estimation algorithm with the cost function defined in equation (4), the KF is written to recognize the parameters of the dynamic polynomial FTC model as the states defined above, which is achieved by rewriting the state transition matrix and measurement output model as follows:

$$\theta_{k+1} = \theta_k + w_k, \quad y_k = H\theta_k + v_k \quad (5)$$

where, $w_k$, represents the system uncertainties with covariance matrix, $Q_k = E[(w_{\{k\}} w_k^T)]$ and $v_k$ is the measurement noise with covariance matrix $R_k = E[(v_k v_k^T)]$ which are presented as diagonal matrices of appropriate dimensions.

The parameters of the covariance matrices have an excessive influence on the response and KF convergence to true estimates, since the $Q_k$ indicates how much confidence is in initial parameter estimates and the $R_k$ indicates how much trust is in the measurement model $y_k$. The covariance matrices are typically manually iteratively tuned, which takes a lot of time and effort, but a better idea is to tune them using a swarm intelligence-based optimization algorithms, such as the particle swarm optimization and ant colony optimization.

Figure 5:
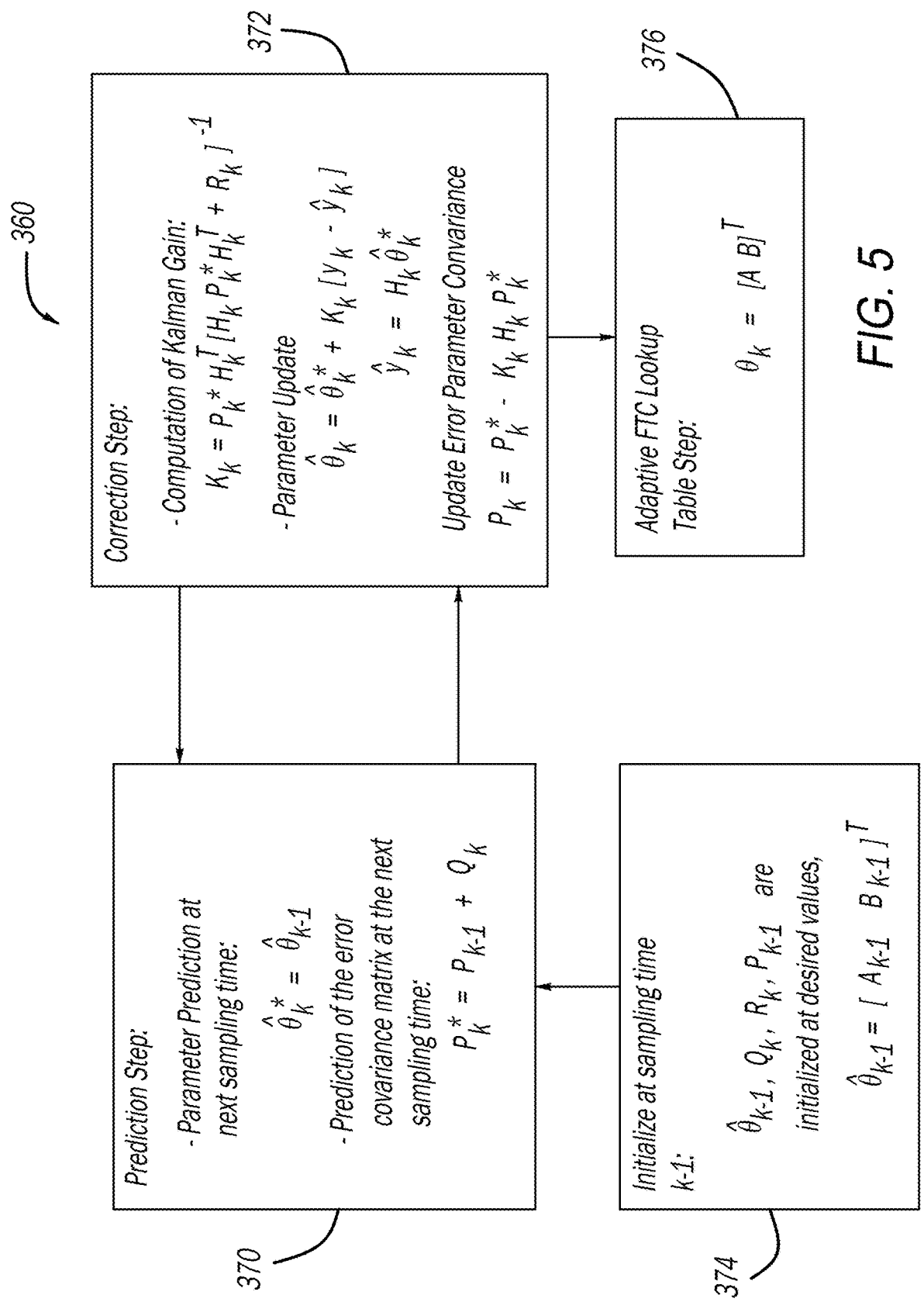
FIG. 5 illustrates exemplary prediction and correction steps implemented using a Kalman filter algorithm according to various examples of the present disclosure.

The Kalman filter 320 can be broken down into prediction and correction modules 310 and 312 which are further summarized in the Kalman filter 320 algorithm overview 360 of FIG. 5 that further characterizes the prediction module 310 as including a prediction step 370 and the correction module 312 as including a correction step 372. The Kalman filter 320 algorithm is initialized at 374 and recursively calculates parameter estimates, $\hat{\theta}_k$, at every sampling step with the prediction and correction step as defined in FIG. 4, which is then used to adapt the parameters of the FTC 330 in the adaptive FTC lookup table step 376 at the current operating points as shown in FIG. 4.

Figure 6:
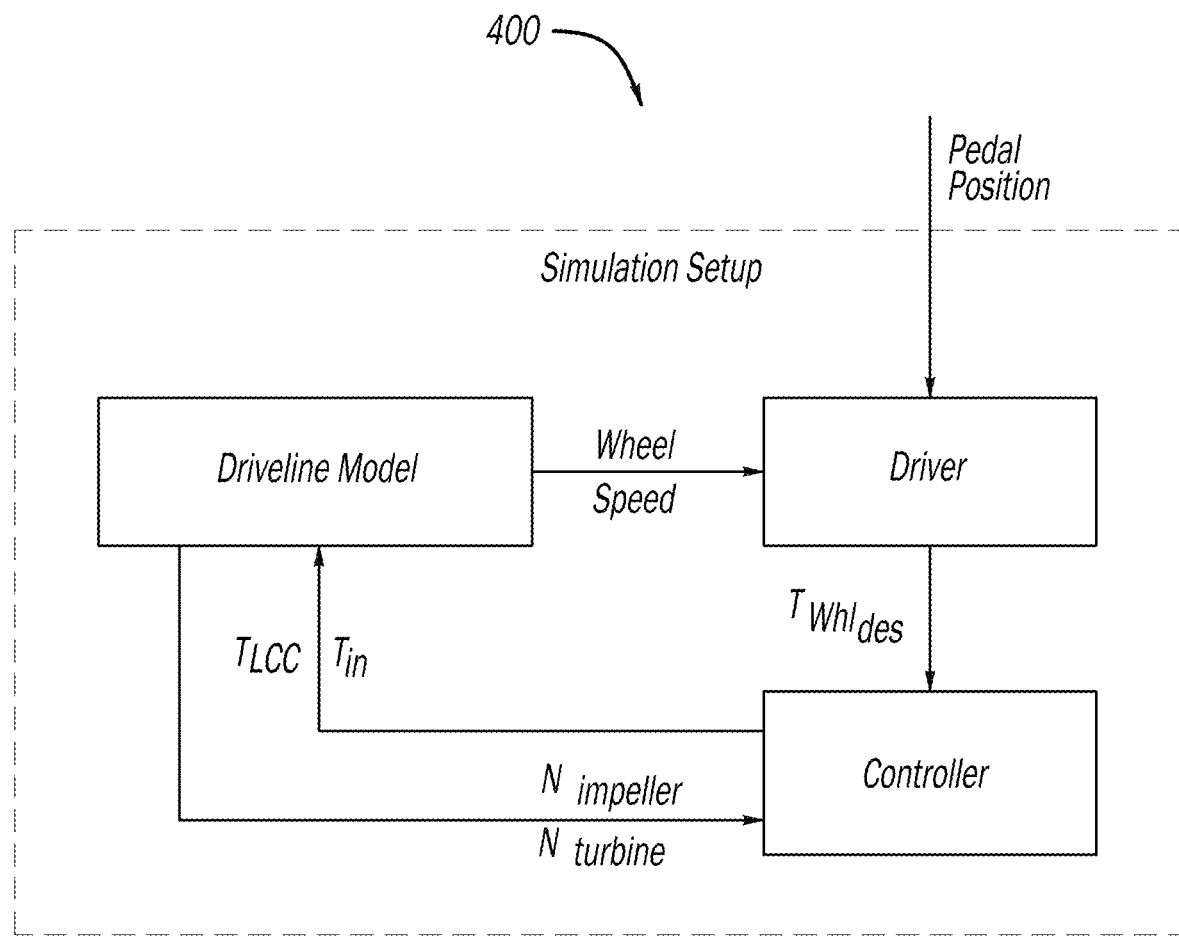
FIG. 6 is a functional block diagram of a simulation setup related to the method for torque convertor modeling for torque control of the hybrid electric vehicle according to various examples of the present disclosure.

With additional reference now to FIG. 6, a simulation setup is generally shown at 400. The driver subsystem calculates the desired wheel torque from the pedal position and the current wheel speed using the following equation.

$$TWhldes = TWhlmin + PDLPCT*(TWhlMax - TWhlmin) \quad (6)$$

where, TWhldes, TWhlmin and TWhlMax represent desired torque, minimum torque, and maximum torque in wheel domain.

The controller subsystem adopts a feedforward control approach for transmission input torque determination. This is achieved by converting the desired wheel torque (TWhldes) to a desired turbine torque with a transmission gear ratio (GR). The desired transmission input torque is determined using the reverse TC model, by taking the current turbine speeds and desired turbine torque as an input and computing a target input speed and desired impeller load torque. The target input speed is used as part of an inertia compensation calculation, to compute a transmission input inertia compensated torque (ICT). The total transmission input torque, Tin, for the desired wheel torque becomes a summation of the desired impeller load torque and the inertia compensated torque. The controller subsystem also commands the lock up clutch via a slip speed controller, with torque capacity control input, TLCC, for lock up clutch actuation of the torque converter clutch, when the speed ratio is within a calibratable specified threshold.

General steps used for torque converter adaptation will now be described. In general, all these steps are done in real time in an efficient manner by the controller 70. First, a base torque converter sequence is carried out including generating steady state torque converter parameters. Next, data preprocessing and selection for model generation is carried out. The polynomial model is then trained using least squares regression rules. Finally, the A and B coefficients of the FTC are updated. The steady state torque converter parameters are generated based on the dynamics of the torque converter 32. Inputs can include, but are not limited to: desired turbine speed range, input speeds, desired speed ratio range (up to 1), K Factor Map, torque ratio map based on desired speed ratio range. Outputs can include, but are not limited to: map of impeller and turbine torque as a function of input speed and speed ratio maximum limited to actual physical maximum impeller and turbine torque achievable by the torque converter specifications, interpolated slip speed across turbine speed range. For the data preprocessing and selection for model generation step, the input include, but are not limited to: impeller and turbine torque map, input and turbine speeds range, slip speed range at different turbine speeds. For the training step, the model is optimized. Model is tuned to increase observability and robustness and reduce overfitting. The estimation is evaluated on untrained data to evaluate estimation performance. If certain performance thresholds (estimation performance, mean squared performance, etc.) are not satisfactory, the method returns to the previous model tuning step.

Adaptation steps will now be described. The steps include a turbine torque observer, an entry conditions check, an adaptation process, and an updating of the A and B coefficients of the FTC. For the turbine torque observer, the inputs can include, but are not limited to: turbine speed, input speed, input torque, torque ratio map as a function of input and turbine speed. The output can include the turbine torque target. For the entry conditions check, the inputs can include a clutch status, a speed ratio, a transmission status check (shifter in "drive", transmission not undergoing a shift), turbine torque target >0 with hysteresis. The outputs can include enable/disable adaption process. In the adaptation process, the turbine speed row search is used to find an upper and lower index that can be used as part of the measurement model formulation. The measurement model formulation is defined in relation to the FTC model. The estimation algorithm (Kalman Filter) is used to estimate A and B coefficients based on turbine torque target and slip speed ($N_c$). Protection functions are carried out. For example, Y1>Y2>Y3 and Quadratic gradient rules are used to determine constraints for the updated A and B curves that are quadratic and unique at different turbine speeds. The quadratic rule checks the minimum of the line to confirm that it is less than 0 if the A coefficient is less than 0 which represents an upward opening curve. If the A coefficient is positive, then it is a downward opening curve. The maximum point is evaluated to confirm that it is greater than the "box" maximum so the window of slip speed is not crossed. The FTC is updated with updated A and B coefficients to determine turbine speed. The outputs include A and B coefficients of the FTC.

Figure 7:
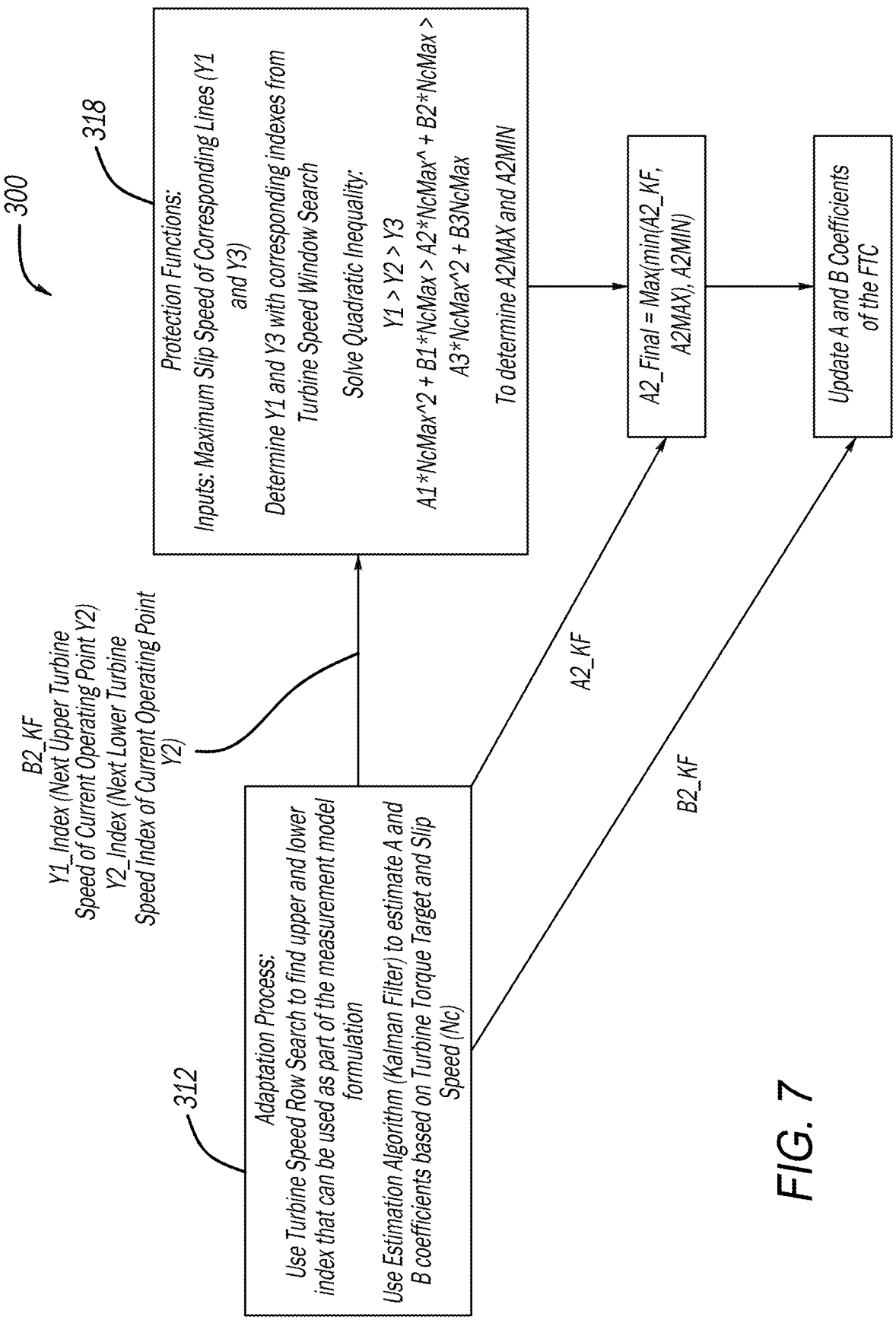
FIG. 7 is a functional block diagram illustrating additional features of the adaption process and the protection functions according to various examples of the present disclosure.

FIG. 7 is a functional block diagram illustrating additional features of the adaption process 312 and the protection functions 318 according to various examples of the present disclosure.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of a hybrid electric vehicle, the electrified powertrain comprising:
   an engine having an engine output;
   an electric motor having an electric motor output;
   a clutch that selectively disengages the engine output from a remainder of the electrified powertrain;
   a torque converter that transfers rotating power from at least one of the engine and the electric motor to a transmission; and
   a controller configured to:
      receive an impeller speed and a turbine speed of the torque converter;
      determine a target turbine torque;
      determine, coefficients as a function of the impeller speed, turbine speed and target turbine torque based on implementation of a Kalman filter as a function of a positive slip speed of the torque converter;
      calculate impeller torque and lock-up clutch torque based on the positive slip speed of the torque converter;
      update an adaptive lookup table based on the coefficients; and
      determine an adapted turbine torque based on the updated adaptive lookup table.

2. The electrified powertrain of claim 1, wherein the controller is further configured to determine a status of the clutch based on the lock-up clutch torque.

3. A method that generates and transfers drive torque to a driveline of a hybrid electric vehicle, the driveline including an engine having an engine output, an electric motor having a first electric motor output, a clutch that selectively disengages the engine output from a remainder of the electrified powertrain, a torque converter that transfers rotating power from at least one of the engine and the electric motor to a transmission, and a controller, the method comprising:
- receiving, at the controller, an impeller speed and a turbine speed of the torque converter;
- determining, at the controller, a target turbine torque;
- determining, at the controller, coefficients as a function of the impeller speed, turbine speed and target turbine torque based on implementation of a Kalman filter as a function of a positive slip speed of the torque converter;
- calculating impeller torque and lock-up clutch torque based on the positive slip speed of the torque converter;
- updating, at the controller, an adaptive lookup table based on the coefficients; and
- determining, at the controller, an adapted turbine torque based on the updated adaptive lookup table.

4. The method of claim 3, further comprising:
determining, at the controller, a status of the clutch based on the lock-up clutch torque.

* * * * *